United States Patent [19]

Biresaw et al.

[11] Patent Number: 5,026,577

[45] Date of Patent: Jun. 25, 1991

[54] MAGNETIC RECORDING MEDIUM LUBRICATED WITH A CHOLESTERIC LIQUID CRYSTAL

[75] Inventors: Girma Biresaw, Lower Burrell; Daniel J. Boland, New Kensington; Vince A. Paola, Penn Township, Westmoreland County; W. Thomas Evans, Indiana; William P. Kampert, Lower Burrell, all of Pa.; Ronald L. Abels, Anna, Ohio

[73] Assignee: Aluminum Company of America, Pittsburgh, Pa.

[21] Appl. No.: 307,498

[22] Filed: Feb. 8, 1989

[51] Int. Cl.[5] .............................................. G11B 23/00
[52] U.S. Cl. ........................................ 428/1; 428/694; 428/695; 428/900; 252/299.01; 252/299.5; 252/52 R
[58] Field of Search ................... 428/900, 694, 695, 1; 252/299.5, 52 R

[56] References Cited

U.S. PATENT DOCUMENTS 3,657,928  4/1972  Melamed ................................ 73/515
3,778,308  12/1973  Roller et al. ........................ 117/234
4,303,738  12/1981  Gini et al. .......................... 428/423.1
4,833,031  5/1987  Kurokawa et al. ................. 428/336

FOREIGN PATENT DOCUMENTS 92682  11/1983  European Pat. Off. .

OTHER PUBLICATIONS

Gribailo, A. P. et al., *Khim. Tekhnol. Topl. Masel* (7) 18–20, 1983, CA99(14):107765z.

Primary Examiner—Bruce H. Hess
Assistant Examiner—Stevan A. Resan
Attorney, Agent, or Firm—Glenn E. Klepac

[57] ABSTRACT

A recording medium comprising a substrate, a memory layer supported by the substrate, and a liquid crystal lubricant overlying the recording medium. The recording medium preferably has a wear layer over the memory layer. The liquid crystal lubricant comprises a cholesteric liquid crystal and cholestryl oleyl carbonate is particularly preferred. The lubricant may be applied to the recording medium by dipping in a dilute solution containing a volatile solvent and then evaporating the solvent, leaving a thin lubricant film over the wear layer.

23 Claims, No Drawings

MAGNETIC RECORDING MEDIUM LUBRICATED WITH A CHOLESTERIC LIQUID CRYSTAL

BACKGROUND OF THE INVENTION

The present invention relates to the field of recording media and to methods for providing lubrication thereon.

DESCRIPTION OF THE PRIOR ART

Memory discs used for mass storage of data in the computer industry are typically provided with magnetic or optically readable memory indicia.

A commercially available metal magnetic memory disc is manufactured by stamping a metal blank from a metal strip, mechanically machining the blank, and then coating the blank with various layers including at least one magnetic memory layer comprising memory indicia. A wear layer is deposited upon the magnetic memory layer, and then a lubricating coating is applied on top of the wear layer. It is very important that the lubricant be long lasting because breakdown of the lubricant can result in interference between the disc and read-write head, resulting in a so-called "head crash".

Recording medium lubricants are known in the prior art. However, such prior art lubricants each suffer from one or more deficiencies making them less than entirely suitable for their intended purpose.

One of the most commonly used lubricants for magnetic recording members is described in Roller et al U.S. Pat. No. 3,778,308. Roller et al describe their lubricant as a thin outer coating of a friction-modifying abrasion-resistant perfluoroalkyl polyether. Perfluoroethyl and perfluoroisopropyl polyethers are preferred. Such polyethers are commercially available under various trade names including the name Fomblin AM 2001.

Although the perfluoroalkyl polyether lubricants perform adequately, they are very expensive. Accordingly, there is a need to provide a less expensive lubricant for recording media having friction and wear performance characteristics equal to or better than the perfluoroalkyl polyethers.

Gini et al U.S. Pat. No. 4,303,738 claims a magnetic recording medium that is lubricated with tridecyl stearate. Various other prior art lubricants are also described in Columns 1 and 2 of the specification. However, none of such prior art lubricants is a liquid crystal.

Cognard et al European Patent Application No. 92,682 claims a lubricant composition for clocks characterized by its content of a liquid crystal or mixture of liquid crystals. The application mentions smectic and nematic liquid crystals, but not cholesteric liquid crystals.

Melamed U.S. Pat. No. 3,657,928 claims an angular movement measurement apparatus comprising adjacent rotatable and stationary discs. A space between the rotatable and stationary discs is filled with a mixture of cholesteric liquid crystal materials including cholesteryl chloride, cholesteryl nonanoate, and cholesteryl oleyl carbonate. The Melamed patent does not suggest using cholesteric liquid crystal compounds on memory discs.

SUMMARY OF THE INVENTION

It is a principal objective of the present invention to provide a lubricated recording medium having improved friction and wear properties compared with prior art recording media.

A related objective of the invention is to provide a recording medium lubricant that is less expensive than prior art lubricants.

A further objective of the invention is to provide a method for lubricating a recording medium.

Additional objects and advantages of the present invention will become apparent from the following description of the invention.

In accordance with the present invention, there is provided a recording medium having an improved organic lubricant coating. The recording medium comprises a substrate and memory indicia supported by the substrate. The substrate may be metal, glass, or a polymer with aluminum alloys being particularly preferred. The memory indicia are in a memory layer supported by the substrate, and they may be encoded by magnetic or optical means. A preferred magnetic memory layer comprises a thin film containing cobalt applied by electroless deposition. The magnetic memory layer may also take the form of iron oxide particles or other magnetizable particles suspended in an organic medium. In a preferred embodiment a wear layer, preferably sputtered carbon, overlies the magnetic memory layer.

The recording medium of the invention is lubricated by an organic lubricant comprising a cholesteric liquid crystal. Some suitable lubricants are cholestryl or cholestanyl chloride or bromide, cholestryl or cholestanyl oleyl carbonate, cholestryl or cholestanyl erucate, cholestryl or cholestanyl erucyl carbonate, cholestryl or cholestanyl oleate, cholestryl or cholestanyl nonanoate, and cholestryl or cholestanyl decanoate. Cholestryl oleyl carbonate is particularly preferred.

The cholesteric liquid crystal is dissolved in a volatile solvent having a boiling point of less than about 100° C., preferably less than about 50° C. The solution contains less than about 10 wt % liquid crystal, preferably less than about 1 wt %. The solvent is preferably a halogenated hydrocarbon, more preferably a halogenated aliphatic. A particularly preferred solvent comprises trifluorochloroethylene. Some other suitable solvents are halogenated hydrocarbons such as trichlorofluoromethane and dichlorodifluoromethane; lower aliphatic alcohols such as methanol, ethanol, and isopropanol; lower aliphatic ketones such as acetone; and benzene.

The dilute liquid crystal solution may be applied onto the recording medium by any of several means including flow coating, spraying, brushing, wiping, or dipping. A dipping technique is particularly preferred.

The solvent is evaporated from the solution, leaving a thin lubricant coating on the wear layer. The lubricant coating has a thickness of less than about 1000 angstroms, preferably less than 100 angstroms.

DETAILED DESCRIPTION OF A PREFERRED EMBODIMENT

The lubricant recording medium and lubricating method of the present invention are described in detail below with reference to a particularly preferred embodiment.

The preferred recording medium has a substrate comprising an aluminum alloy, preferably an alloy of the 5000 Series. A 5086 (A.A. Series) alloy is particularly preferred. The substrate is made by blanking a disc from a sheet, then flattening the disc. Thereafter, the substrate is usually rough machined and then fine machined or polished to a high level of smoothness, e.g., less than about 250 angstroms surface roughness, often referred to as a mirror-like finish. The polished substrate is treated to activate its surface so that coatings deposited thereon will have a high level of adhesion. One suitable form of activation comprises treatment with acidified metal salt solutions, then rinsing to remove excess solution.

In the preferred recording medium described herein, a hard underlayer is applied to the activated aluminum surface as a base for a memory layer. The hard underlayer is preferably a nickel-phosphorus coating that is deposited from a nickel sulfate-hypophosphite electrolyte. Alternatively, the hard underlayer may be sputtered chromium. The hard underlayer typically has a thickness ranging from about 10 to about 25 microns.

A memory layer is applied over the hard underlayer. In the magnetic recording medium described herein, the memory layer comprises a thin film of cobalt or similar material which is suitable for magnetic encodation of memory indicia. A cobalt-phosphorus thin film is normally applied by electroless deposition as disclosed in U.S. Pat. No. 3,138,479, the disclosure of which is incorporated herein by reference. Other suitable magnetic memory materials such as cobalt-chromium thin films may also be employed in the memory layer.

A wear layer or protective layer is applied over the memory layer to increase the useful life of the disc. Carbon is normally used for the protective layer, which is applied by sputtering techniques which are well known in the art. Other suitable materials for the protective layer are silica, zirconia, magnesia, boron nitride, alumina, titanium carbide, and titanium diboride.

In order to reduce friction and minimize abrasive wear on the protective layer during use, the recording medium is provided with an organic lubricant comprising a cholesteric liquid crystal. A preferred lubricant is cholestryl oleyl carbonate, which has a cholesteric order between 18° and 31° C. At lower temperatures ($-10°$ to $18°$ C.), cholestryl oleyl carbonate has smectic order. The lubricant is applied to the disc as a thin film.

The cholesteric liquid crystal lubricant is dissolved in an organic solvent, preferably a volatile solvent having a boiling point less than about 100° C. A particularly preferred solvent is trifluorochloroethylene. The lubricant is applied to the disc by forming a dilute (about 0.25 wt %) solution, then dipping the entire disc in the solution. The solvent is next evaporated, leaving a thin film coating estimated to have less than about 100 angstroms thickness.

A set of tests was performed wherein cholestryl oleyl carbonate ("COC") was compared with prior art lubricants for friction and wear properties on magnetic discs. Results of the comparative tests are summarized in Tables I and II. In these Tables, the terms "Prior Art A" and "Prior Art B" refer to different locations at which a prior art perfluoroalkyl polyether lubricant was applied to various discs. The term "Prior Art C" refers to an unknown, proprietary lubricant that is applied to a commercially available disc for drive "Y".

In Tables I and II, the term "Stiction" refers to a measurement in grams of the force required to start movement of the test disc, recorded at 1 rpm for 1 revolution of the disc. The term "Friction" refers to friction measured in grams, at 35 rpm after 5 disc revolutions. Disc wear was estimated by measuring the number of cycles for peak friction and load failure to occur.

The test results summarized in Tables I and II indicate that cholestryl oleyl carbonate performed better than both prior art lubricants on a magnetic memory disc under most conditions.

TABLE I

Stiction, Friction, and Drag Tests on Disc With COC Lubricant Versus Prior Art Lubricant

| | Coercivity | Lube Type (% in Solvent) | Lowest Landing Speed rpm | 500 Cycle Speed rpm Lift Off | 500 Cycle Speed rpm Landing | Initial Stiction g | Peak Friction g | Drag Cycle to Peak Friction | Drag Cycle to Load Fail |
|---|---|---|---|---|---|---|---|---|---|
| 1. | High | COC (0.25 wt %) | 605 | 1,008 | 837 | 2.16 | 5.00 | 16,500 | >16,500 |
| 2. | High | Prior Art B | 836 | 1,112 | 900 | 1.97 | 7.00 | 6,300 | 8,000 |
| 3. | Low | COC (0.24 wt %) | 640 | 888 | 2.36 | 5.00 | 22,500 | 22,500 | |
| 4. | Low | Prior Art A | 810 | 1,008 | 839 | 2.39 | 7.75 | 5,700 | 6,500 |
| 5. | Low | Prior Art B | 643 | 845 | 728 | 2.17 | 6.75 | 4,800 | 4,500 |
| 6. | Low | COC (0.25 wt %) | — | 1,035 | 843 | 3.32 | — | — | — |
| 7. | Low | Prior Art A | — | 1,034 | 866 | 2.49 | 7.0 | 4,185 | — |
| 8. | Low | Prior Art B | — | 971 | 783 | 2.31 | 7.2 | 2,910 | — |
| 9. | High | COC (0.25 wt %) | — | 985 | 835 | 2.15 | 3.5 | 13,320 | — |
| 10. | High | Prior Art B | — | 1,195 | 1,010 | 2.26 | 7.1 | 5,128 | — |

TABLE II

Stiction in Grams of Discs With COC and Commercial Lubricants Mounted on Various Drives

| | Drive | Lube and Disc | Start | After Oven | After Drags 2,500 | 5,000 | 7,500 | 10,000 | 15,000 | Visual Inspection |
|---|---|---|---|---|---|---|---|---|---|---|
| 1. | X | Prior Art B ($S_n$); n = 14 | 16.1 (1.4) | 16.0 (2.5) | 24.1 (4.1) | 26.2 (2.6) | 27.8 (3.9) | 30.9 (6.3) | — | OK |
| 2. | X | 0.20 wt % COC | 16 | — | — | 27 | 31.8 | 34 | — | OK |
| 3. | X | 0.24 wt % COC | 15 | — | — | 34 | 26.1 | 27 | — | 1 Light Score |
| 4. | Y | Prior Art B | 16 | 19 | 50 | 64 | — | 113 | — | 1 Slight Wear |
| 5. | Y | Prior Art C | 18 | — | 16 | 44 | — | 50 | 63 | OK |
| 6. | Y | 0.24 wt % COC | 16 | 18 | 24 | — | 37 | 50 | — | OK |

With the foregoing detailed description of our invention in mind, numerous changes and variations therein will occur to persons skilled in the art without departing from the spirit and scope of the following claims.

What is claimed is:

1. A recording medium comprising:

(a) a substrate, (b) a memory layer supported by said substrate, and (c) an organic lubricant overlying said recording medium, said organic lubricant consisting essentially of a cholesteric liquid crystal.

2. The recording medium of claim 1 wherein said cholesteric liquid crystal is selected from the group consisting of cholestryl or cholestanyl chloride or bromide, cholestryl or cholestanyl oleyl carbonate, cholestryl or cholestanyl erucate, cholestryl or cholestanyl erucyl carbonate, cholestryl or cholestanyl oleate, cholestryl or cholestanyl nonanoate, and cholestryl or cholestanyl decanoate.

3. The recording medium of claim 1 wherein said cholesteric liquid crystal comprises cholestryl oleyl carbonate.

4. The recording medium of claim 1 further comprising:

(d) a wear layer overlying said memory layer, said cholesteric liquid crystal lubricant overlying said wear layer.

5. The recording medium of claim 4 wherein said lubricant comprises a film having a thickness of less than about 1000 angstroms.

6. The recording medium of claim 4 wherein said wear layer comprises sputtered carbon.

7. The recording medium of claim 4 wherein said film has a thickness of less than 100 angstroms.

8. A method of lubricating a recording medium comprising a substrate and a memory layer supported by said substrate, said method comprising:

(a) providing a solution comprising a liquid crystal dissolved in a solvent having a boiling point of less than about 100° C., (b) applying said solution onto said recording medium, and (c) evaporating said solvent from said solution, thereby leaving a lubricant coating on said recording medium, said lubricant coating consisting essentially of a liquid crystal.

9. The method of claim 8 wherein said lubricant coating comprises a thin film having a thickness of less than about 1000 angstroms.

10. The method of claim 8 wherein said solvent comprises a halogenated aliphatic hydrocarbon having a boiling point of less than about 50° C.

11. The method of claim 10 wherein said solution comprises less than about 10 wt % of said liquid crystal.

12. The method of claim 8 wherein said solvent comprises trifluorochloroethylene.

13. The method of claim 8 wherein said liquid crystal comprises a cholesteric liquid crystal.

14. The method of claim 8 wherein said liquid crystal is selected from the group consisting of cholestryl or cholestanyl chloride or bromide, cholestryl or cholestanyl oleyl carbonate, cholestryl or cholestanyl erucate, cholestryl or cholestanyl erucyl carbonate, cholestryl or cholestanyl oleate, cholestryl or cholestanyl nonanoate, and cholestryl or cholestanyl decanoate.

15. The method of claim 8 wherein said liquid crystal comprises cholestryl oleyl carbonate.

16. The method of claim 8 wherein said solution consists essentially of less than about 1 wt % cholestryl oleyl carbonate dissolved in a halogenated hydrocarbon solvent.

17. A lubricant composition suitable for lubricating a recording medium, said composition comprising less than about 10 wt % of a cholesteric liquid crystal dissolved in an organic solvent having a boiling point of less than about 100° C.

18. The lubricant composition of claim 17 consisting essentially of cholestryl oleyl carbonate dissolved in a halogenated hydrocarbon solvent.

19. The lubricant composition of claim 17 wherein said solvent is selected from the group consisting of halogenated hydrocarbons, lower aliphatic alcohols, lower aliphatic ketones, and benzene.

20. The lubricant composition of claim 17 wherein said solvent has a boiling point of less than about 50° C.

21. In a method of lubricating a memory disc comprising a substrate, a memory layer supported by said substrate and a wear layer overlying said memory layer, said method comprising the steps of:

(a) applying onto said wear layer a solution comprising an organic lubricant dissolved in an organic solvent having a boiling point of less than about 100° C., and (b) evaporating said solvent from said solution, thereby leaving on said wear layer an organic lubricant coating comprising a film having a thickness of less than about 1000 angstroms;

the improvement wherein said organic lubricant consists essentially of a cholesteric liquid crystal.

22. The method of claim 21 wherein said wear layer comprises sputtered carbon.

23. The method of claim 21 wherein said cholesteric liquid crystal comprises cholestryl oleyl carbonate.

* * * * *

UNITED STATES PATENT AND TRADEMARK OFFICE
CERTIFICATE OF CORRECTION

PATENT NO. : 5,026,577

DATED : June 25, 1991

INVENTOR(S) : Girma Biresaw et al

It is certified that error appears in the above-identified patent and that said Letters Patent is hereby corrected as shown below:

On the title page:
Under References Cited:
4,833,031                    Change "5/1987" to --5/1989--.

Columns 3-4:
Table I, Row 3., change the numbers in the Column Headings as follows:

| | |
|---|---|
| Column "Landing" | Change "2.36" to --670--. |
| Column "Initial Stiction" | Change "5.00" to --2.36--. |
| Column "Peak Friction" | Change "22,500" to --5.00--. |
| Column "Load Fail" | Insert --22,500--. |

Signed and Sealed this

Seventeenth Day of November, 1992

Attest:

DOUGLAS B. COMER

*Attesting Officer*          Acting Commissioner of Patents and Trademarks